T. P. WATSON.
SPRAYING DEVICE.
APPLICATION FILED NOV. 11, 1908.

926,791.

Patented July 6, 1909.

Witnesses
H. B. Davis,
E. A. Jordan.

Inventor:
Thomas P. Watson
By Hayes & Harmon
Attys.

UNITED STATES PATENT OFFICE.

THOMAS P. WATSON, OF HOULTON, MAINE.

SPRAYING DEVICE.

No. 926,791.

Specification of Letters Patent.

Patented July 6, 1909.

Application filed November 11, 1908. Serial No. 462,098.

*To all whom it may concern:*

Be it known that I, THOMAS P. WATSON, of Houlton, county of Aroostook, State of Maine, have invented an Improvement in Spraying Devices, of which the following is a specification.

This invention relates to spraying devices for spraying plants with a liquid material which may or may not contain an insect poison.

It has for its object to construct a device which may be employed to spray the top and also both sides of the plant, which is simple and durable, which may be moved along between the rows of plants without injury to the plants, and may be turned in an upward direction to raise the spraying nozzles so that they will not interfere with obstructions, such as stones and stumps, when moving the apparatus to and from the field, and also so that the liquid material will not escape from the nozzles at such time and become wasted, and may be supported at different elevations and turned in any elevated position it may occupy, and also held in any position it may be set.

Figure 1:
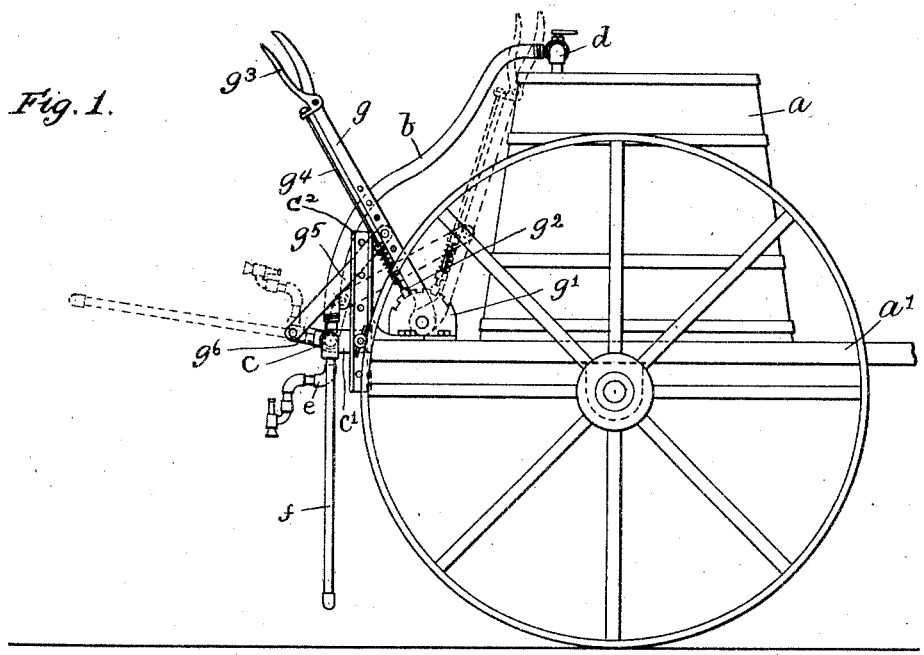
Figure 2:
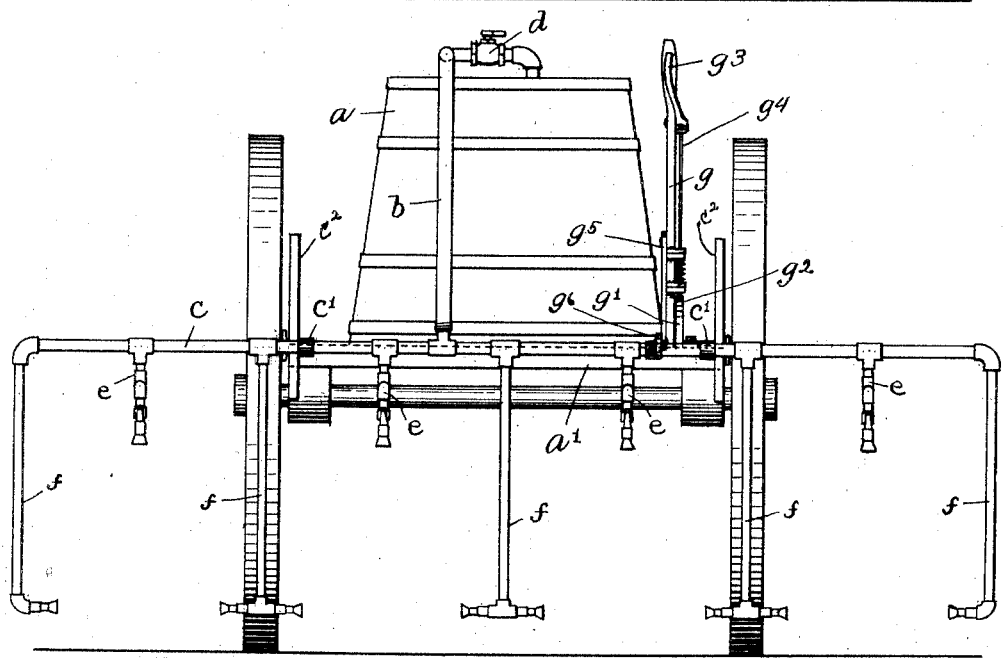

Figure 1 is a side elevation of a spraying apparatus embodying this invention. Fig. 2 is a rear elevation of the same.

$a$ represents a tank mounted on a truck frame $a'$ and provided with any suitable pump, not shown, by which the pressure may be applied to its contents, said parts being of any well-known or suitable construction.

$b$ represents a flexible hose for conducting the liquid material from the tank although any other suitable form of conductor may be employed. $d$ is a shut-off valve contained in said conductor.

$c$ is a horizontal pipe which is made quite long and of any suitable size. It extends transversely with respect to the truck-frame, in parallelism with the axle of the truck. It is supported by brackets $c'$ in which it is mounted, so as to be rocked or turned on its axis. Said brackets $c'$ are secured to uprights $c^2$ which are secured to the frame. As it is desirable that the pipe $c$ may be held at different elevations said brackets $c'$ are adjustably connected to their upright supports, and, as here shown, the upright supports are each provided with a vertical row of holes through any one or more of which a bolt or other fastening may pass which is employed to secure the bracket in place thereon. The pipe $c$ has depending from it a series of short pipes $e$, provided at their extremities with spraying nozzles and arranged to spray the tops of the plants. It also has depending from it a series of long pipes $f$, provided at their extremities with spraying nozzles and arranged to spray the sides of the plants. The short pipes and long pipes are alternately arranged. The spraying nozzles on the short pipes are therefore directed downward and the spraying nozzles on the long pipes are directed horizontally or thereabouts. The short pipes $e$ are arranged at suitable distances apart, corresponding to the distance between the rows of plants, and the long pipes $f$ are arranged at regular intervals between said short pipes. As here shown, the main delivery pipe $c$ has four short pipes $e$ provided with downwardly directed spraying nozzles for spraying the tops of four rows of plants and it has three long pipes $f$ arranged between said short pipes, which extend downward between the rows of plants and which are provided at their extremities each with two oppositely disposed horizontal spraying nozzles for spraying the sides of the plants, and it also has two long pipes $f$ arranged at its ends which extend downward between the rows and are provided at their extremities with a single horizontally disposed spraying nozzle. With this number of depending pipes, arranged as shown, four rows of plants may be sprayed. To provide for a greater or less number of rows of plants the number of depending pipes will be correspondingly increased or decreased.

For the purpose of rocking the main horizontal delivery pipe $c$, so that the depending pipes may be moved into horizontal position or thereabouts, as represented by dotted lines Fig. 1, to provide for passing over obstructions such as stones and stumps, as for instance, when drawing the apparatus to and from the field, and also for preventing liquid material from dripping needlessly when not required, a set lever $g$ is provided, which is pivoted at its lower end to a sector $g'$ and a dog $g^2$ for said lever is adapted to be moved into and out of engagement with said sector by a spring controlled hand-lever $g^3$ which is connected with said dog by a connecting rod $g^4$. Said set-lever is connected by a link $g^5$ with an arm $g^6$ secured to the main pipe $c$. The set-lever has a row of holes for connection therewith of the link $g^5$.

Movement of said set-lever in one or the other direction correspondingly rocks the main delivery pipe, and the means shown for connecting the link $g^5$ therewith at different points provides for rocking said main delivery pipe when supported in different elevated positions, yet said pipe may be rocked by other means in lieu of the set-lever here shown, providing such means is adapted to rock said pipe in its different elevated positions.

When the plants are young or small, the main delivery pipe will be adjusted to its lowermost position, and when the plants are large, it will be raised so that in any case the horizontal spraying nozzles will be so disposed as to direct the spray to the sides of the plants. Adjustment of the nozzles toward and from the ground may be obtained also by means of the set-lever operating to rock the main delivery pipe $c$.

Having thus described my invention, what I claim as new and desire to secure by Letters Patent is:—

1. In a spraying-device, a main horizontal delivery pipe adapted to be connected with a tank, depending pipes leading from said main pipe, spraying-nozzles arranged at the extremities of said depending pipes, means for supporting said main pipe at different elevations, whereby the nozzles are held at different distances from the ground, a pivoted set-lever, a toothed sector with which it coöperates, and adjustable means for connecting said set-lever with said main pipe, whereby said main pipe may be turned in any elevated position it may occupy and held in any position it may be set, substantially as described.

2. In a spraying-device, the combination with a tank, of a main horizontal delivery-pipe, depending pipes leading from said main pipe, spraying-nozzles at the extremities of said depending pipes, a conductor connecting said main pipe with said tank, brackets supporting said main pipe in which it is free to turn on its axis, means for supporting said brackets at different elevations, a pivoted set-lever, a toothed sector with which it coöperates, and adjustable means for connecting said set-lever with said main pipe whereby said main pipe may be turned in any elevated position it may occupy and held in any position it may be set, substantially as described.

In testimony whereof, I have signed my name to this specification, in the presence of two subscribing witnesses.

THOMAS P. WATSON.

Witnesses:
JAMES H. McPARTLAND,
FRANK E. GRAY.